(12) United States Patent
Zhou

(10) Patent No.: US 10,338,871 B2
(45) Date of Patent: Jul. 2, 2019

(54) INFORMATION PROCESSING METHOD, INFORMATION PROCESSING APPARATUS, AND USER EQUIPMENT

(71) Applicant: Beijing Zhigu Rui Tuo Tech Co., Ltd., Beijing (CN)

(72) Inventor: Liang Zhou, Beijing (CN)

(73) Assignee: BEIJING ZHIGU RUI TUO TECH CO., LTD., Beijing (CN)

(*) Notice: Subject to any disclaimer, the term of this patent is extended or adjusted under 35 U.S.C. 154(b) by 0 days.

(21) Appl. No.: 15/284,620

(22) Filed: Oct. 4, 2016

(65) Prior Publication Data

US 2017/0154451 A1 Jun. 1, 2017

(30) Foreign Application Priority Data

Nov. 30, 2015 (CN) .......................... 2015 1 0856592

(51) Int. Cl.
*G06F 3/14* (2006.01)
*G06F 3/147* (2006.01)
*G06T 11/00* (2006.01)

(52) U.S. Cl.
CPC .............. *G06F 3/14* (2013.01); *G06F 3/147* (2013.01); *G06T 11/00* (2013.01)

(58) Field of Classification Search
None
See application file for complete search history.

(56) References Cited

U.S. PATENT DOCUMENTS

| | | | |
|---|---|---|---|
| 2009/0033737 A1* | 2/2009 | Goose | G06F 3/0481 348/14.07 |
| 2010/0050237 A1* | 2/2010 | Bokor | G06F 17/30041 726/4 |
| 2012/0218299 A1* | 8/2012 | Hayakawa | A63F 13/06 345/633 |

(Continued)

FOREIGN PATENT DOCUMENTS

| | | |
|---|---|---|
| CN | 103793063 A | 5/2014 |
| CN | 104024984 A | 9/2014 |

(Continued)

*Primary Examiner* — Michelle Chin
(74) *Attorney, Agent, or Firm* — Sheppard Mullin Richter & Hampton LLP

(57) ABSTRACT

Embodiments of the present application disclose an information processing method, an information processing apparatus, and a user equipment. The method comprises: obtaining, by a user equipment, device information of an external device in an environment in which a user is located, wherein the device information comprises function information and working status information of the external device; determining at least one virtual object in virtual presented content at least according to the function information, wherein the at least one virtual object has a virtual attribute that matches at least one function corresponding to the function information; and determining a presentation attribute of the at least one virtual object at least according to the working status information. According to the technical solution in the embodiments of the present application, sense experience brought by a virtual presentation device to the user can be consistent with other sense experience brought by the external device, and better immersive virtual reality experience is brought to the user.

9 Claims, 6 Drawing Sheets

(56) References Cited

U.S. PATENT DOCUMENTS

2013/0033485 A1\* 2/2013 Kollin .................. G06F 1/1637
345/419
2014/0221090 A1 8/2014 Mutschler et al.
2016/0106360 A1\* 4/2016 Choi .................. A61B 5/0205
434/247

FOREIGN PATENT DOCUMENTS

CN 104898843 A 9/2015
CN 105022281 A 11/2015

\* cited by examiner

INFORMATION PROCESSING METHOD, INFORMATION PROCESSING APPARATUS, AND USER EQUIPMENT

TECHNICAL FIELD

The present application relates to the technical field of information processing, and in particular, to an information processing method, an information processing apparatus, and a user equipment.

BACKGROUND

A virtual reality technology is immersing, in a realistic presentation manner, a user in a virtual environment constructed by an electronic device, to cause the user to feel personally in the environment. Due to a small size, a head-mounted virtual reality device such as smart glasses or a smart helmet can enable the user to conveniently enjoy immersive virtual visual experience and auditory experience in many environments. In addition, with the rapid development of smart households and smart devices, interconnection between indoor smart devices becomes universal.

SUMMARY

A possible objective of embodiments of the present application is to provide a virtual reality based information processing solution.

According to a first aspect, a possible implementing solution of the present application provides an information processing method, comprising:

obtaining, by a user equipment, device information of an external device in an environment in which a user is located, wherein the device information comprises function information and working status information of the external device;

determining at least one virtual object in virtual presented content at least according to the function information, wherein the at least one virtual object has a virtual attribute that matches at least one function corresponding to the function information; and determining a presentation attribute of the at least one virtual object at least according to the working status information.

According to a second aspect, a possible implementing solution of the present application provides an information processing apparatus, comprising:

a device information obtaining module, configured to obtain device information of an external device in an environment in which a user is located, wherein the device information comprises function information and working status information of the external device;

a virtual object determining module, configured to determine at least one virtual object in virtual presented content at least according to the function information, wherein the at least one virtual object has a virtual attribute that matches at least one function corresponding to the function information; and a presentation attribute determining module, configured to determine a presentation attribute of the at least one virtual object at least according to the working status information.

According to a third aspect, a possible implementing solution of the present application provides a user equipment, comprising:

a memory, configured to store a program; and a processor, configured to execute the program stored in the memory, wherein the program causes the processor to execute the following operations:

obtaining device information of an external device in an environment in which a user is located, wherein the device information comprises function information and working status information of the external device;

determining at least one virtual object in virtual presented content at least according to the function information, wherein the at least one virtual object has a virtual attribute that matches at least one function corresponding to the function information; and determining a presentation attribute of the at least one virtual object at least according to the working status information.

According to at least one implementing solution in the embodiments of the present application, according to a function of an external device in a spatial environment in which a user is located, a matched virtual presented object in a virtual presentation device is found, and a presentation attribute of the virtual presentation device is determined at least according to a working status of the external device. Therefore, sense experience brought by the virtual presentation device to the user can be consistent with other sense experience brought by the external device, and better immersive virtual reality experience is brought to the user.

DETAILED DESCRIPTION

Specific implementing manners of the present application are further described below in detail with reference to the accompanying drawings (same numerals in the accompanying drawings represent same elements) and embodiments. The following embodiments are intended to describe the present application, but not to limit the scope of the present application.

A person skilled in the art may understand that, terms such as "first" and "second" in the present application are intended only to distinguish different steps, devices, modules, or the like, which neither represent any particular technical meaning, nor indicate a necessary logical order between them.

The inventor of the present application finds that, due to development of a virtual reality technology, a user can conduct a virtual reality experience activity in an environment that is not specially intended for virtual reality experience, such as a home. Generally, there is another device in the environment, which may bring other sense experience to the user. For example, an air conditioner is mounted in a room for cooling or heating. In some possible scenarios, the other sense experience brought by the another device is inconsistent with sense experience of the user in a virtual reality scenario, and influences immersion of the user in the virtual reality scenario. For example, the user feels the air conditioner blowing to the user, but in the virtual reality scenario, the user does not see flowers and plants wobbling in a virtual scene; or the air conditioner is cooling the room and a current temperature is low, but a hot background is displayed in a virtual scene.

Figure 1:
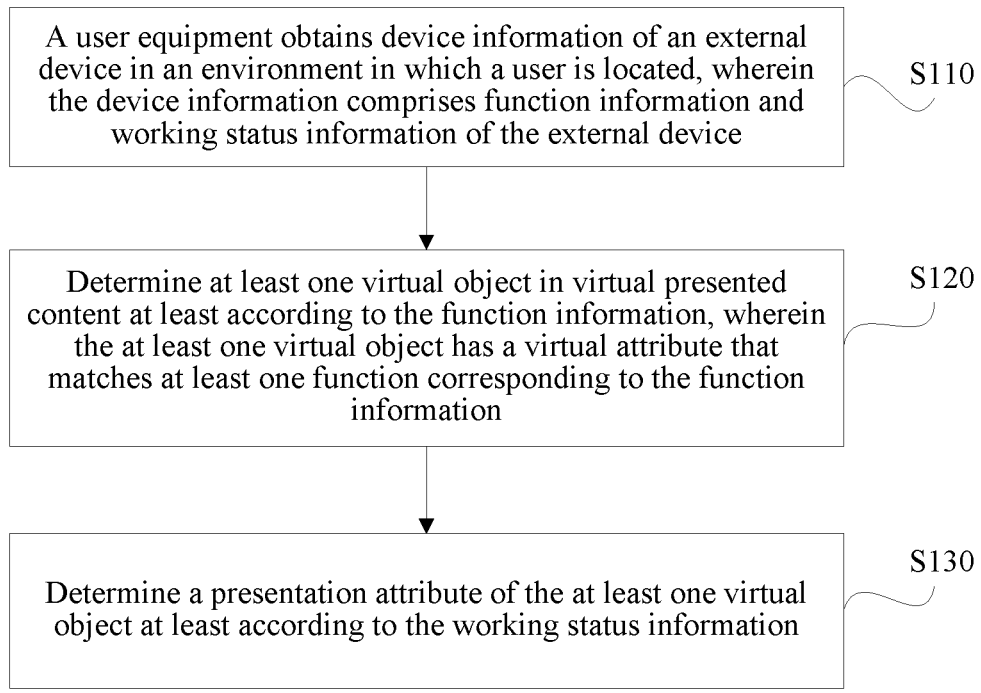
FIG. 1 is a flowchart of an information processing method according to an embodiment of the present application.

Therefore, as shown in FIG. 1, an embodiment of the present application provides an information processing method, comprising:

S110: A user equipment obtains device information of an external device in an environment in which a user is located, wherein the device information comprises function information and working status information of the external device.

S120: Determine at least one virtual object in virtual presented content at least according to the function information, wherein the at least one virtual object has a virtual attribute that matches at least one function corresponding to the function information.

S130: Determine a presentation attribute of the at least one virtual object at least according to the working status information.

According to an implementing solution in this embodiment of the present application, according to a function of an external device in a spatial environment in which a user is located, a matched virtual presented object in virtual presented content of a virtual presentation device is found, and a presentation attribute of the virtual presentation device is determined at least according to a working status of the external device. Therefore, sense experience brought by the virtual presentation device to the user can be consistent with other sense experience brought by the external device, and better immersive virtual reality experience is brought to the user.

For example, an information processing apparatus provided in the present application executes this embodiment, and performs S110 to S130. Specifically, the information processing apparatus may be disposed in a user equipment in a manner of software, hardware, or software and hardware, or the information processing apparatus is the user equipment. The user equipment comprises but not limited to: a smartphone, smart glasses, a smart helmet, and the like, wherein the smart glasses comprise smart frame classes and smart contact lenses.

The steps in this embodiment of the present application are further described by using the following implementing manner.

S110: A user equipment obtains device information of an external device in an environment in which a user is located, wherein the device information comprises function information and working status information of the external device.

In a possible implementing manner, optionally, the user equipment may obtain the device information through device interaction (for example, communication) with the external device or another external device.

In another possible implementing manner, the user equipment may obtain the device information in another possible manner. For example, the device information is obtained only on the user equipment side. For example, the device information is obtained by obtaining an image of the external device and performing image recognition; or the device information is obtained according to a manual input by the user.

In this embodiment of the present application, the function information of the external device is information corresponding to a function of the external device. The function information may comprise, for example, function type information. In some possible implementing manners, the function information may further comprise function parameter information. For example, a function type of a fan is blowing, and function parameter information may comprise, for example, information about a capacity of discharged air and an air discharging direction and range.

In a possible implementing manner, the working status information is information related to a working status of the external device. For example, the working status information may comprise: information about whether the external device is working, for example, whether the fan is in an on state or an off state. In some possible scenarios, the external device may have multiple working modes. For example, an air conditioner has heating and cooling modes, a strong-wind mode to a weak-wind mode, and a high-temperature mode to a low-temperature mode. Therefore, in some possible implementing manners, optionally, the working status information may further comprise working mode information.

In another possible implementing manner, optionally, the working status information may further comprise other information related to sense experience of the user, for example, information about a temperature that is set on the air conditioner and information about a current temperature.

In a possible implementing manner, regardless of what the function of the external device is, S120 is performed after the device information is obtained.

In another possible implementing manner, optionally, between S110 and S120, the method further comprises the following operation:

determining whether the function corresponding to the function information is a sense related function that influences at least one specified sense of the user, wherein S120 is performed as a response only when the function is the sense related function.

In a possible implementing manner, the at least one specified sense is another sense different from a sense corresponding to a virtual presentation, and may be preset. For example, when the virtual presentation is an audiovisual presentation corresponding to a visual sense and an auditory sense, the at least one specified sense may comprise a touch sense and/or a smell sense; when the virtual presentation is a visual presentation corresponding only to the visual sense, the at least one specified sense may further comprise the auditory sense.

In this implementing manner, the external device may be an external device that influences the at least one specified sense of the user, and may be, for example, a device that influences the touch sense of the user, such as an air conditioner, a fan, a humidifier, or a refrigerator; a device that influences the smell sense of the user, such as an oven; and a device that emits sound and influences the auditory sense of the user when the virtual presentation for the user does not comprise an auditory presentation, such as a television or a sound box.

This embodiment of the present application is mainly described by using an example in which the virtual presentation is a visual presentation. In another possible scenario, the virtual presentation may be another presentation manner, and in this case, the at least one specified sense may comprise the visual sense.

In this implementing manner, when the function is not the sense related function, subsequent operations may be not performed, to save a device resource.

S120: Determine at least one virtual object in virtual presented content at least according to the function information, wherein the at least one virtual object has a virtual attribute that matches at least one function corresponding to the function information.

In this embodiment of the present application, a background of the virtual presented content may also be considered as a virtual object.

In this implementing manner, that a virtual object has a virtual attribute that matches a function mainly comprises two cases:

In one case, a virtual function of the virtual object is the same as the function. For example, a function of a first external device is heating, the virtual object is a fire, and according to a setting, the fire may correspond to multiple virtual functions, which comprise, for example, heating and illumination. In this case, because a virtual function of the fire is the same as the function of the external device, it may be considered that the virtual object, that is, the fire, has a virtual attribute that matches the function of heating.

In the other case, a presentation status influencing factor of the virtual object is the function. For example, a function of a second external device is blowing, and the virtual object is still a fire. According to a setting, a presentation status of the fire is influenced by multiple influencing factors, which comprise, for example, blowing and precipitation. In this case, because the influencing factors comprise the blowing, it may be considered that the virtual object, that is, the fire, has a virtual attribute that matches the function of blowing.

Therefore, according to the foregoing description, in a possible implementing manner, optionally, the virtual attribute may comprise at least one virtual function.

In this implementing manner, that the at least one virtual object has the virtual attribute that matches the at least one function comprises:

at least one virtual function in the at least one virtual function is the same as the at least one function.

In some possible scenarios, the at least one function may be different from the at least one virtual function in text description, but senses and feelings of the user on the two are consistent; therefore, it is also considered that the at least one function is the same as the at least one virtual function. In some possible implementing manners, for example, a table of correspondence between a function and a virtual function may be preset, to determine all virtual functions that are the same as a particular function and/or determine all functions that are the same as a particular virtual function, to determine the at least one virtual object.

In another possible implementing manner, optionally, the virtual attribute may comprise at least one presentation status influencing factor; and that the at least one virtual object has the virtual attribute that matches the at least one function comprises:

the at least one presentation status influencing factor comprises the at least one function.

A person skilled in the art may know that, in some possible scenarios, a virtual attribute of a virtual object may simultaneously match multiple functions of multiple external devices. For example, in the implementing manner described above, the virtual attribute of the fire simultaneously matches the function of the first external device and the function of the second external device. Therefore, in S120, the fire may be determined according to the function of the first external device, or the fire may be determined according to the function of the second external device.

In S120, at least one virtual object whose virtual attribute matches the at least one function may be further determined in all virtual objects in the virtual presented content according to the function information of the external device.

S130: Determine a presentation attribute of the at least one virtual object at least according to the working status information.

In this implementing manner, a presentation status of the at least one virtual object is variable. Therefore, in a possible implementing manner, optionally, the presentation attribute may comprise a presentation status.

That is, in this implementing manner, S130 may be: determining the presentation status of the at least one virtual object at least according to the working status information.

In this implementing manner, the presentation status of the virtual object may be determined to be consistent with the working status of the external device, to cause that sense experience of the user on the presentation status of the virtual object is consistent with sense experience brought by the working status of the external device to the user. For example, the external device is in a working state (for example, an actual air conditioner is working in an air discharging state), and the virtual object is also in a corresponding virtual working state (for example, a fan in an image is in a rotating state); or the external device is in a stop working state (for example, an actual air conditioner is in a stop working state), and the virtual object is also in a corresponding virtual stop state (for example, fan blades in an image are in a stationary state).

Figure 2A:
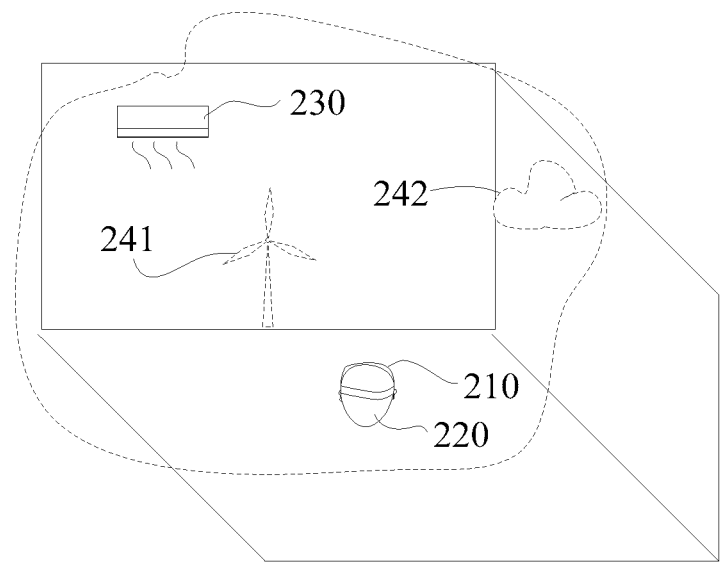
FIG. 2a and FIG. 2b are respectively schematic diagrams of virtual scenarios presented when a method according to an embodiment of the present application is not used and when a method according to an embodiment of the present application is used in an application scenario.
Figure 2B:
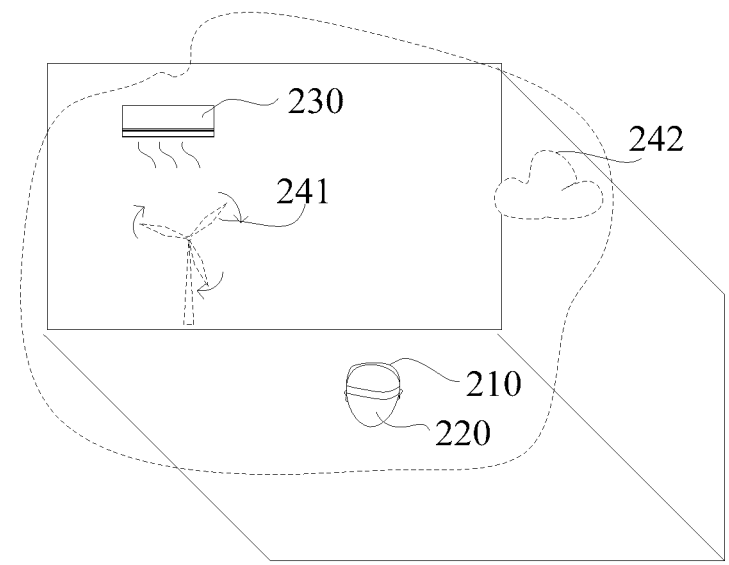

For example, as shown in FIG. 2a and FIG. 2b, the solid line part represents a real object, and the dashed line part is a virtual scenario that is presented to a user 220 by a user equipment virtual reality glasses 210.

As shown in FIG. 2a and FIG. 2b, in this implementing manner, an environment in which the user 220 is located is a room, the room comprises an external device air conditioner 230, a function corresponding to function information of the air conditioner 230 comprises: cooling, heating, blowing, dehumidification, and the like, and a current working status comprises blowing with a large air capacity.

When the method in this implementing manner is not used, for example, the user may see a virtual scenario shown in FIG. 2a. Virtual presented content corresponding to the virtual scenario comprises two virtual objects: a windmill 241 and a cloud 242. Certainly, in another possible implementing manner, a background of the virtual scenario (for example, a background of a broad grassland) may also be a virtual object.

It can be known from the environment in which the user is actually located, the air conditioner 230 is blowing to the user. In this case, the user may feel wind through the touch sense of the body. However, eyes of the user see that the windmill 241 is in a stationary state in the virtual scenario. Therefore, touch experience obtained by using the touch sense of the user is inconsistent with visual experience obtained by using the visual sense of the user, ruining immersion of the user in the virtual scenario.

Therefore, according to the method in this embodiment of the present application, the virtual reality glasses 210 may obtain, from the air conditioner 230 through device interaction, device information of the air conditioner 230, that is, function information and working status information of the air conditioner 230.

According to S120, it is determined that a virtual object in the two virtual objects comprised in the virtual presented content—the windmill 241 has a virtual attribute that matches the function of blowing corresponding to the function information: As influenced by the blowing, the windmill rotates.

Finally, a presentation status of the windmill 241 is determined according to the working status information of the air conditioner 230, to cause that visual sense experience brought by the presentation status of the windmill 241 to the user is consistent with touch sense experience brought by the working status of blowing of the air conditioner 230 to the user.

According to the method in this embodiment of the present application, the virtual scenario shown in FIG. 2b can be obtained. When feeling wind, the user 220 sees blades of the windmill 241 rotating. Immersion of the user in the virtual scenario can be enhanced, and user experience can be improved.

In some possible scenarios, some virtual objects are not presented all the time, but are presented only when the external device is in a specified working status. Therefore, in a possible implementing manner, optionally, the presentation attribute further comprises: whether to be presented.

For example, in a possible implementing manner, when the working status information of the air conditioner comprises that the air conditioner is cooling the room, a virtual object—snow is presented in the virtual scenario. When the working status of the air conditioner is not cooling, the snow is not presented.

In a possible implementing manner, the user equipment is a device that virtually presents the at least one virtual object. Therefore, the method further comprises:

presenting the at least one virtual object according to the presentation attribute.

A person skilled in the art may understand that, in the method of the specific implementing manner of the present application, the sequence numbers of the steps do not mean an execution order, the execution order of the steps should be determined according to their functions and internal logic, and shall not be construed as a limitation to the implementation process of the specific implementing manner of the present application.

Figure 3:
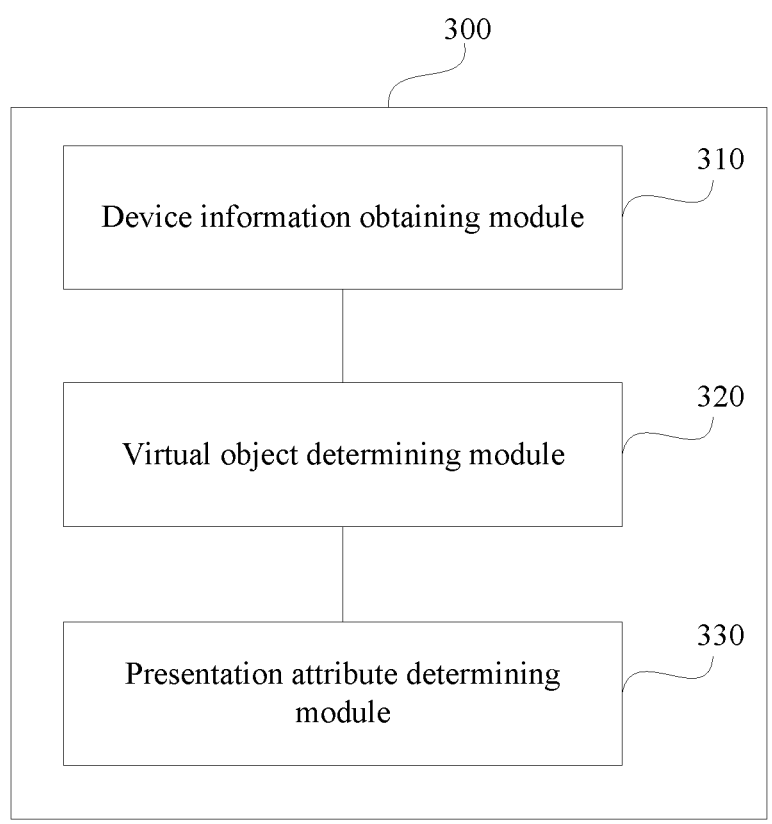
FIG. 3 is a schematic block diagram of a structure of an information processing apparatus according to an embodiment of the present application.

As shown in FIG. 3, an embodiment of the present application provides an information processing apparatus 300, comprising:

a device information obtaining module 310, configured to obtain device information of an external device in an environment in which a user is located, wherein the device information comprises function information and working status information of the external device;

a virtual object determining module 320, configured to determine at least one virtual object in virtual presented content at least according to the function information, wherein the at least one virtual object has a virtual attribute that matches at least one function corresponding to the function information; and a presentation attribute determining module 330, configured to determine a presentation attribute of the at least one virtual object at least according to the working status information.

According to an implementing solution in this embodiment of the present application, according to a function of an external device in a spatial environment in which a user is located, a matched virtual presented object in virtual presented content of a virtual presentation device is found, and a presentation attribute of the virtual presentation device is determined at least according to a working status of the external device. Therefore, sense experience brought by the virtual presentation device to the user can be consistent with other sense experience brought by the external device, and better immersive virtual reality experience is brought to the user.

The apparatus in this embodiment of the present application is further described by using the following implementing manner.

In a possible implementing manner, optionally, the device information obtaining module 310 may be a communications module, configured to obtain the device information through device interaction with the external device or another external device.

In another possible implementing manner, optionally, the device information obtaining module 310 may have another possible structure. For example, in a possible implementing manner, the device information obtaining module 310 may comprise a camera, configured to obtain an image of the external device, and then obtain the device information through image recognition.

In this embodiment of the present application, the function information of the external device is information corresponding to a function of the external device. The function information may comprise, for example, function type information. In some possible implementing manners, the function information may further comprise function parameter information. For example, a function type of a fan is blowing, and function parameter information may comprise, for example, information about a capacity of discharged air.

In this embodiment of the present application, a background of the virtual presented content may also be considered as a virtual object.

In a possible implementing manner, the working status information is information related to a working status of the external device. For example, the working status information may comprise: information about whether the external device is working. In some possible scenarios, the external device may have multiple working modes. For example, an air conditioner has heating and cooling modes, a strong-wind mode to a weak-wind mode, and a high-temperature mode to a low-temperature mode. Therefore, in some possible implementing manners, optionally, the working status information may further comprise working mode information.

In another possible implementing manner, optionally, the working status information may further comprise other information related to sense experience of the user, for example, information about a temperature that is set on the air conditioner and information about a current temperature.

In this implementing manner, that a virtual object has a virtual attribute that matches a function mainly comprises two cases:

In one case, a virtual function of the virtual object is the same as the function.

In the other case, a presentation status influencing factor of the virtual object is the function.

Therefore, in a possible implementing manner, optionally, the virtual attribute may comprise at least one virtual function.

In this implementing manner, that the at least one virtual object has the virtual attribute that matches the at least one function comprises:

at least one virtual function in the at least one virtual function is the same as the at least one function.

In some possible scenarios, the at least one function may be different from the at least one virtual function in text description, but senses and feelings of the user on the two are consistent; therefore, in this implementing manner, it is also considered that the at least one function is the same as the at least one virtual function. In some possible implementing manners, for example, a table of correspondence between a function and a virtual function may be preset, to determine all virtual functions that are the same as a particular function, and/or determine all functions that are the same as a particular virtual function, to determine the at least one virtual object.

In another possible implementing manner, optionally, the virtual attribute may comprise at least one presentation status influencing factor; and that the at least one virtual object has the virtual attribute that matches the at least one function comprises:

the at least one presentation status influencing factor comprises the at least one function.

A person skilled in the art may know that, in some possible scenarios, a virtual attribute of a virtual object may simultaneously match multiple functions of multiple external devices.

In this implementing manner, a presentation status of the at least one virtual object is variable. Therefore, in a possible implementing manner, optionally, the presentation attribute may comprise a presentation status.

Figure 4A:
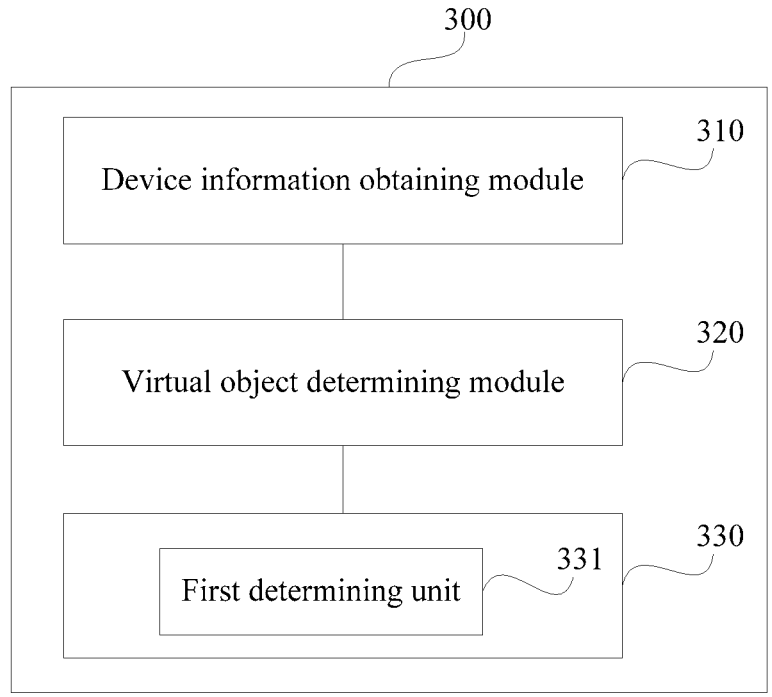
FIG. 4a to FIG. 4d are schematic block diagrams of structures of four information processing apparatuses according to an embodiment of the present application.

Therefore, in a possible implementing manner, as shown in FIG. 4a, the presentation attribute determining module 330 comprises:

a first determining unit 331, configured to determine a presentation status of the at least one virtual object at least according to the working status information.

In this implementing manner, the presentation status of the virtual object may be determined to be consistent with the working status of the external device, to cause that sense experience of the user on the presentation status of the virtual object is consistent with sense experience brought by the working status of the external device to the user.

Figure 4B:
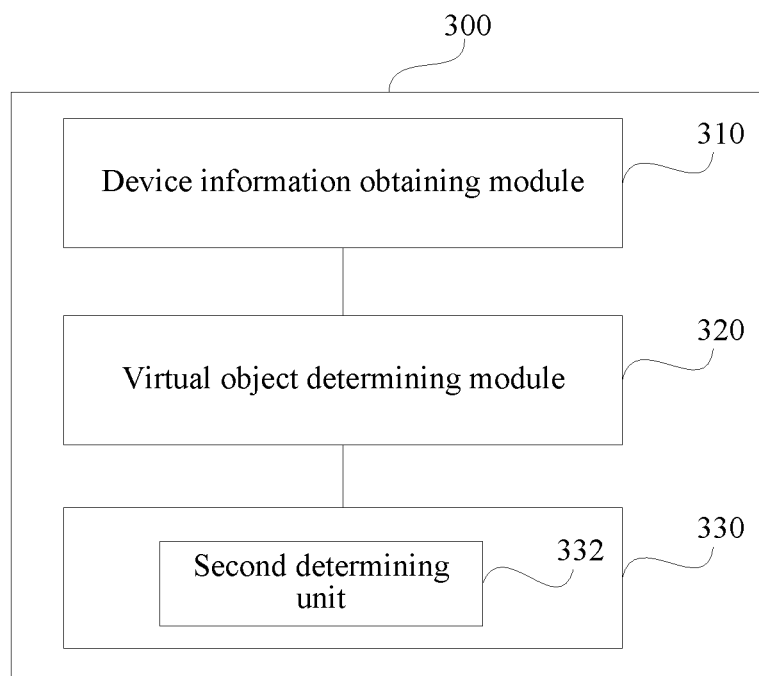

In some possible scenarios, some virtual objects are not presented all the time, but are presented only when the external device is in a specified working status. In a possible implementing manner, optionally, the presentation attribute further comprises: whether to be presented. In this implementing manner, as shown in FIG. 4b, the presentation attribute determining module 330 may comprise:

a second determining unit 332, configured to determine, at least according to the working status information, whether to present the at least one virtual object.

A person skilled in the art may know that, in another possible implementing manner, the presentation attribute determining module 330 may comprise both the first determining unit 331 and the second determining unit 332.

Figure 4C:
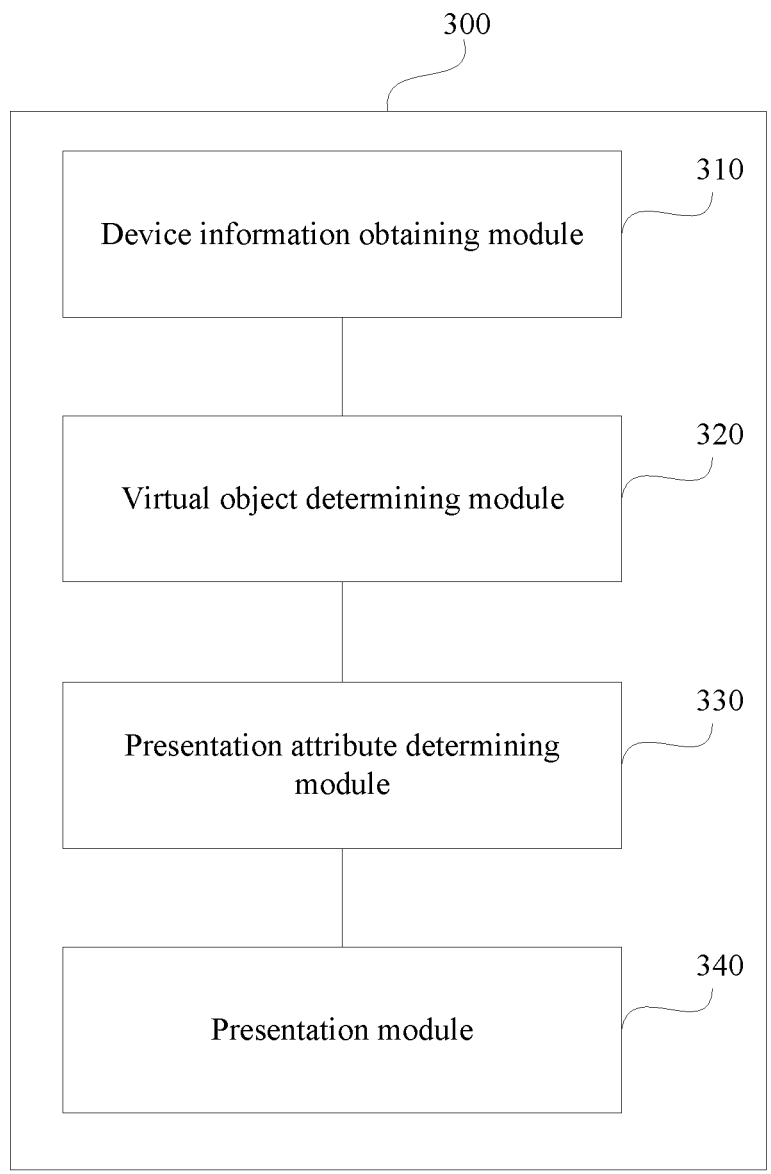

In a possible implementing manner, the apparatus 300 may be a device that virtually presents the at least one virtual object. Therefore, as shown in FIG. 4c, the apparatus 300 further comprises:

a presentation module 340, configured to present the at least one virtual object according to the presentation attribute.

Figure 4D:
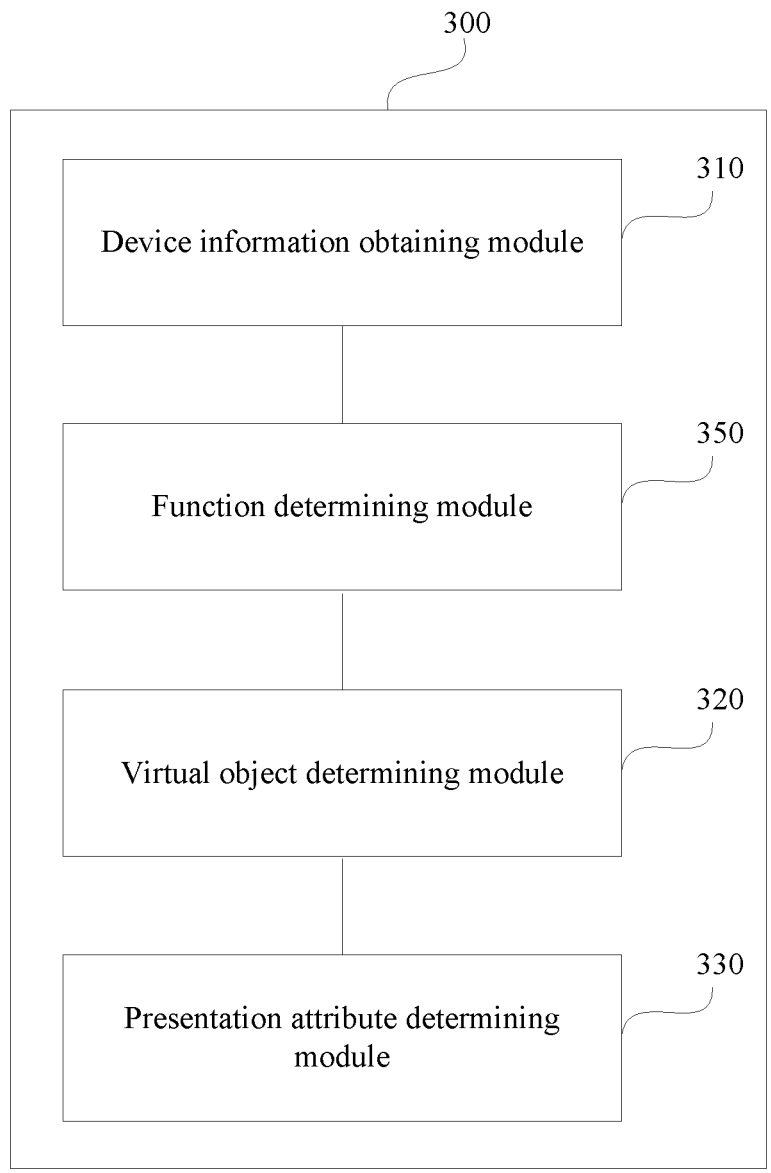

As shown in FIG. 4d, in a possible implementing manner, optionally, the apparatus 300 may further comprise:

a function determining module 350, configured to determine whether the function is a sense related function that influences at least one specified sense of the user.

In this implementing manner, the virtual object determining module 320 is further configured to determine the at least one virtual object at least according to the function information as a response only when the function is the sense related function.

In a possible implementing manner, the at least one specified sense is another sense different from a sense corresponding to a virtual presentation, and may be preset. For example, when the virtual presentation is an audiovisual presentation corresponding to a visual sense and an auditory sense, the at least one specified sense may comprise a touch sense and/or a smell sense; when the virtual presentation is a visual presentation corresponding only to the visual sense, the at least one specified sense may further comprise the auditory sense.

In this implementing manner, the external device may be an external device that influences the at least one specified sense of the user.

Certainly, this embodiment of the present application is mainly described by using an example in which the virtual presentation is a visual presentation. In another possible scenario, the virtual presentation may be another presentation manner, and in this case, the at least one specified sense may comprise the visual sense.

In this implementing manner, when the function is not the sense related function, subsequent operations may be not performed, to save a device resource.

For further descriptions of the modules and units in this embodiment of the present application, refer to corresponding descriptions in the foregoing method embodiment.

Figure 5:
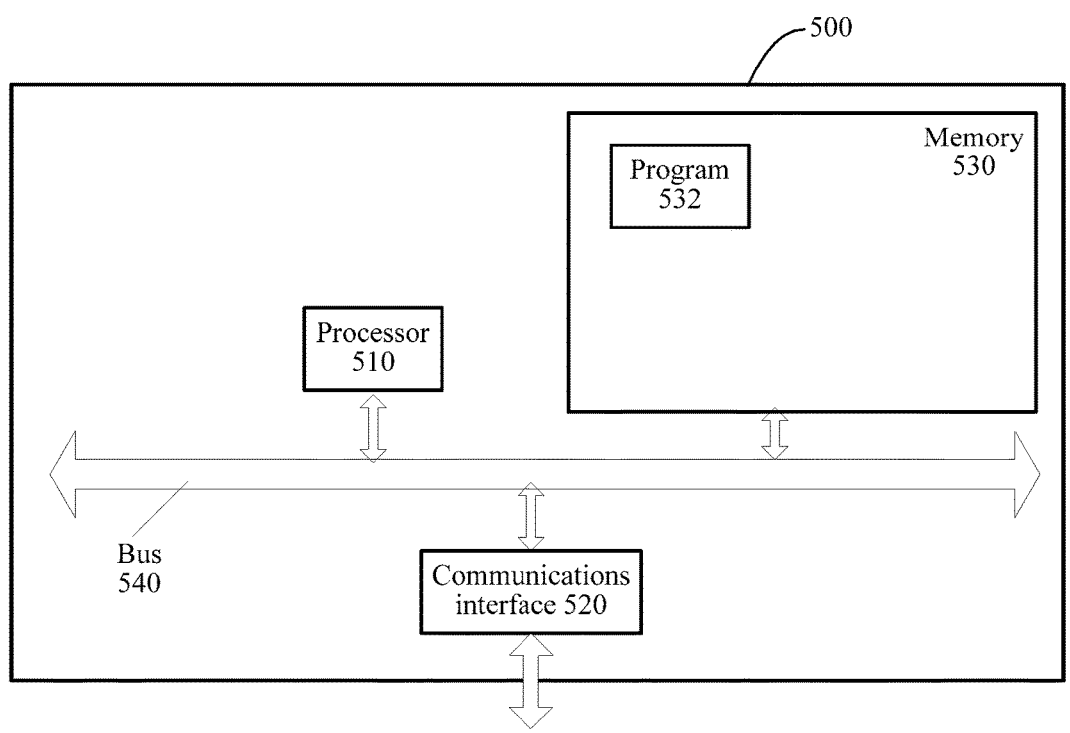
FIG. 5 is a schematic structural diagram of a structure of a user equipment according to an embodiment of the present application.

FIG. 5 is a schematic structural diagram of a user equipment 500 according to an embodiment of the present application. Specific implementation of the user equipment 500 is not limited in a specific embodiment of the present application. As shown in FIG. 5, the user equipment 500 may comprise:

a processor 510, a communications interface 520, a memory 530, and a communications bus 540.

The processor 510, the communications interface 520, and the memory 530 communicate with each other by using the communications bus 540.

The communications interface 520 is configured to communicate with a network element such as a client.

The processor 510 is configured to execute a program 532, and may specifically execute related steps in the foregoing method embodiment.

Specifically, the program 532 may comprise program code, wherein the program code comprises a computer operation instruction.

The processor 510 may be a central processing unit (CPU), or an application specific integrated circuit (ASIC), or be configured into one or more integrated circuits for implementing the embodiments of the present application.

The memory 530 is configured to store the program 532. The memory 530 may comprise a high-speed random access memory (RAM), and may further comprise a non-volatile memory, for example, at least one magnetic disk storage. The program 532 may be specifically configured to cause the user equipment 500 to execute the following operations:

obtaining device information of an external device in an environment in which a user is located, wherein the device information comprises function information and working status information of the external device;

determining at least one virtual object in virtual presented content at least according to the function information, wherein the at least one virtual object has a virtual attribute that matches at least one function corresponding to the function information; and determining a presentation attribute of the at least one virtual object at least according to the working status information.

For specific implementation of the steps in the program 532, reference may be made to corresponding descriptions of corresponding steps and units in the foregoing embodiments, and details are not described herein again. It may be clearly understood by a person skilled in the art that, for the purpose of convenient and brief description, for the specific working process of the foregoing device and module, reference may be made to the corresponding process in the foregoing method embodiment, and the details are not described herein again.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in the form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium, and comprises several instructions for instructing a computer device (which may be a personal computer, a server, a network device, or the like) to perform all or a part of the steps of the methods described in the embodiments of the present application. The storage medium comprises any medium that can store program code, such as a USB flash drive, a removable hard disk, a read-only memory (ROM), a RAM, a magnetic disk, or an optical disc.

The foregoing implementing manners are merely intended to describe the present application rather than limit the present application. A person of ordinary skill in the art may make modifications and variations without departing from the spirit and scope of the present application. Therefore, all equivalent technical solutions shall also fall within the scope of the present application, and the patent protection scope of the present application shall be subject to the claims.

What is claimed is:

1. An information processing method, comprising:
   obtaining, by a user equipment, device information of an external device in an environment in which a user is located, wherein the device information comprises function information related to a function of the external device and working status information related to a working status of the external device;
   determining whether the function of the external device enables the user to have at least one specified sense of the external device, wherein the at least one specified sense of the external device comprises at least one of a touch sense and a smell sense;
   in response to determining that the function of the external device enables the user to have the at least one specified sense of the external device, determining at least one virtual object in virtual presented content at least according to the function information, wherein the at least one virtual object has a virtual attribute that matches at least one function corresponding to the function information, and wherein the virtual object has a virtual function, which is the same as the function of the external device, or a presentation status influencing factor, which is the function of the external device;
   determining a presentation attribute of the at least one virtual object at least according to the working status information.

2. The method of claim 1, wherein the presentation attribute comprises:
   the presentation status.

3. The method of claim 1, wherein the presentation attribute comprises:
   whether to be presented.

4. The method of claim 1, wherein the method further comprises:
   presenting the at least one virtual object according to the presentation attribute.

5. An information processing apparatus, comprising:
   a device information obtaining module, configured to obtain device information of an external device in an environment in which a user is located, wherein the device information comprises function information related to a function of the external device and working status information related to a working status of the external device;
   a function determining module, configured to determine whether the function of the external device enables the user to have at least one specified sense of the external device, wherein the at least one specified sense of the external device comprises at least one of a touch sense and a smell sense;
   a virtual object determining module, configured to determine, in response to determining that the function of the external device enables the user to have the at least one specified sense of the external device, at least one virtual object in virtual presented content at least according to the function information, wherein the at least one virtual object has a virtual attribute that matches at least one function corresponding to the function information, and wherein the virtual object has a virtual function, which is the same as the function of the external device, or a presentation status influencing factor, which is the function of the external device; and
   a presentation attribute determining module, configured to determine a presentation attribute of the at least one virtual object at least according to the working status information.

6. The apparatus of claim 5, wherein the presentation attribute comprises:
   the presentation status.

7. The apparatus of claim 5, wherein the presentation attribute comprises:
   whether to be presented.

8. The apparatus of claim 5, wherein the apparatus further comprises:
   a presentation module, configured to present the at least one virtual object according to the presentation attribute.

9. A user equipment, wherein the user equipment comprises:
- a memory, configured to store a program; and
- a processor, configured to execute the program stored in the memory, wherein the program causes the processor to execute the following operations:
- obtaining device information of an external device in an environment in which a user is located, wherein the device information comprises function information related to a function of the external device and working status information related to a working status of the external device;
- determining whether the function of the external device enables the user to have at least one specified sense of the external device, wherein the at least one specified sense of the external device comprises at least one of a touch sense and a smell sense;
- in response to determining that the function of the external device enables the user to have the at least one specified sense of the external device, determining at least one virtual object in virtual presented content at least according to the function information, wherein the at least one virtual object has a virtual attribute that matches at least one function corresponding to the function information, and wherein the virtual object has a virtual function, which is the same as the function of the external device, or a presentation status influencing factor, which is the function of the external device;
- determining a presentation attribute of the at least one virtual object at least according to the working status information.

* * * * *